United States Patent
Brewer et al.

(10) Patent No.: US 9,590,982 B2
(45) Date of Patent: Mar. 7, 2017

(54) PROXIMITY BASED DUAL AUTHENTICATION FOR A WIRELESS NETWORK

(71) Applicant: GLOBALFOUNDRIES INC., Grand Cayman (KY)

(72) Inventors: Derek R. Brewer, Bowling Green, OH (US); Kerry M. Langford, Rochester, MN (US); Robert D. Wilhelm, Cheyenne, WY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/166,078

(22) Filed: Jan. 28, 2014

(65) Prior Publication Data

US 2015/0113620 A1    Apr. 23, 2015

Related U.S. Application Data

(63) Continuation of application No. 14/056,238, filed on Oct. 17, 2013, now abandoned.

(51) Int. Cl.
*H04L 9/32* (2006.01)
*H04L 29/06* (2006.01)
*H04W 12/06* (2009.01)

(52) U.S. Cl.
CPC ......... *H04L 63/0853* (2013.01); *H04L 63/08* (2013.01); *H04W 12/06* (2013.01)

(58) Field of Classification Search
CPC .................................................... H04W 4/02
See application file for complete search history.

(56) References Cited

U.S. PATENT DOCUMENTS

| | | | |
|---|---|---|---|
| 7,378,939 B2 | 5/2008 | Sengupta et al. | |
| 7,607,015 B2 | 10/2009 | Fascenda | |
| 7,676,829 B1* | 3/2010 | Gui | G06F 21/31 726/5 |
| 7,711,366 B1 | 5/2010 | O'Neil et al. | |
| 7,739,705 B2* | 6/2010 | Lee | H04H 60/31 725/10 |
| 7,822,406 B2 | 10/2010 | Lee et al. | |
| 8,045,961 B2 | 10/2011 | Ayed et al. | |
| 8,112,066 B2 | 2/2012 | Ben Ayed | |

(Continued)

OTHER PUBLICATIONS

Brewer et al., "Proximity Based Dual Authentication for a Wireless Network", U.S. Appl. No. 14/056,238, filed Oct. 17, 2013.

*Primary Examiner* — Josnel Jeudy
(74) *Attorney, Agent, or Firm* — DeLio, Peterson & Curcio LLC; Kelly M. Nowak

(57) ABSTRACT

A method of accessing a network wirelessly is described. In the method an authentication is provided to access the network from a wireless device to a first network node via a first wireless signal having a first range. A proximity validation is provided to access the network through the first network node. The proximity validation is provided to the first network node when the wireless device is within a second range of a second wireless signal of a second network node. The second range is less than the first range. The method further provides for accessing the network when both the authentication and the proximity validation are valid.

20 Claims, 6 Drawing Sheets

(56) References Cited

U.S. PATENT DOCUMENTS

| | | |
|---|---|---|
| 2005/0200521 A1* | 9/2005 | Rodriguez ............. G01C 21/08 342/357.31 |
| 2007/0214364 A1 | 9/2007 | Roberts |
| 2008/0057906 A1 | 3/2008 | Lee et al. |
| 2008/0146230 A1 | 6/2008 | Pandian et al. |
| 2010/0317323 A1* | 12/2010 | Facemire ............ H04L 63/0492 455/411 |
| 2012/0023558 A1 | 1/2012 | Rafiq |
| 2012/0144468 A1* | 6/2012 | Pratt et al. ........................ 726/7 |
| 2013/0016636 A1* | 1/2013 | Berger .................. H04W 60/00 370/310 |
| 2015/0029869 A1* | 1/2015 | Wolcott ................. H04B 3/487 370/242 |
| 2015/0052576 A1* | 2/2015 | Togawa ............................ 726/1 |

\* cited by examiner

PROXIMITY BASED DUAL AUTHENTICATION FOR A WIRELESS NETWORK

CROSS-REFERENCE TO RELATED APPLICATIONS

This application is a continuation of co-pending U.S. patent application Ser. No. 14/056,238, filed Oct. 17, 2013. The aforementioned related patent application is herein incorporated by reference in its entirety.

FIELD

This invention relates generally to wireless networking, and more particularly, to proximity based security for a wireless network.

BACKGROUND

Wireless communication technology has become ubiquitous. Wireless Local Area Network (WLAN) uses wireless communication technology to connect wireless devices to a wired network. Wireless devices may include phones, tablets, desktop computers, servers, laptops, gaming consoles, cable television consoles, and appliances. For a wireless device to gain access to a network the wireless device usually has to provide some authentication that it is authorized to be on the network.

SUMMARY

In an embodiment, a method of accessing a network wirelessly is described. In the method an authentication is provided to access the network from a wireless device to a first network node via a first wireless signal having a first range. A proximity validation is provided to access the network through the first network node. The proximity validation is provided to the first network node when the wireless device is within a second range of a second wireless signal of a second network node. The second range is less than the first range. The method further provides for accessing the network when both the authentication and the proximity validation are valid.

In another embodiment, a method of accessing a network wirelessly is described. An authentication is received to access the network from a wireless device to a first network node via a first wireless signal having a first range. A proximity validation is received for the wireless device to access the network. The proximity validation received by the first network node when the wireless device is within a second range of a second wireless signal of a second network node. The second range is less than the first range. The method includes providing the wireless device access to the network when both the authentication and the proximity validation are valid.

In yet another embodiment, a method of accessing a network wirelessly is described. The method includes providing a proximity validation to a wireless device that is within a second range of a second wireless signal of a second network node. The wireless device operably accesses the network over a first wireless signal having a first range to a first network node. The second range is less than the first range and the first network node requires a proximity validation to allow the wireless device to access the network.

BRIEF DESCRIPTION OF THE DRAWINGS

Embodiments will be better understood from the following detailed description with reference to the drawings, in which.

DETAILED DESCRIPTION

Figure 1:
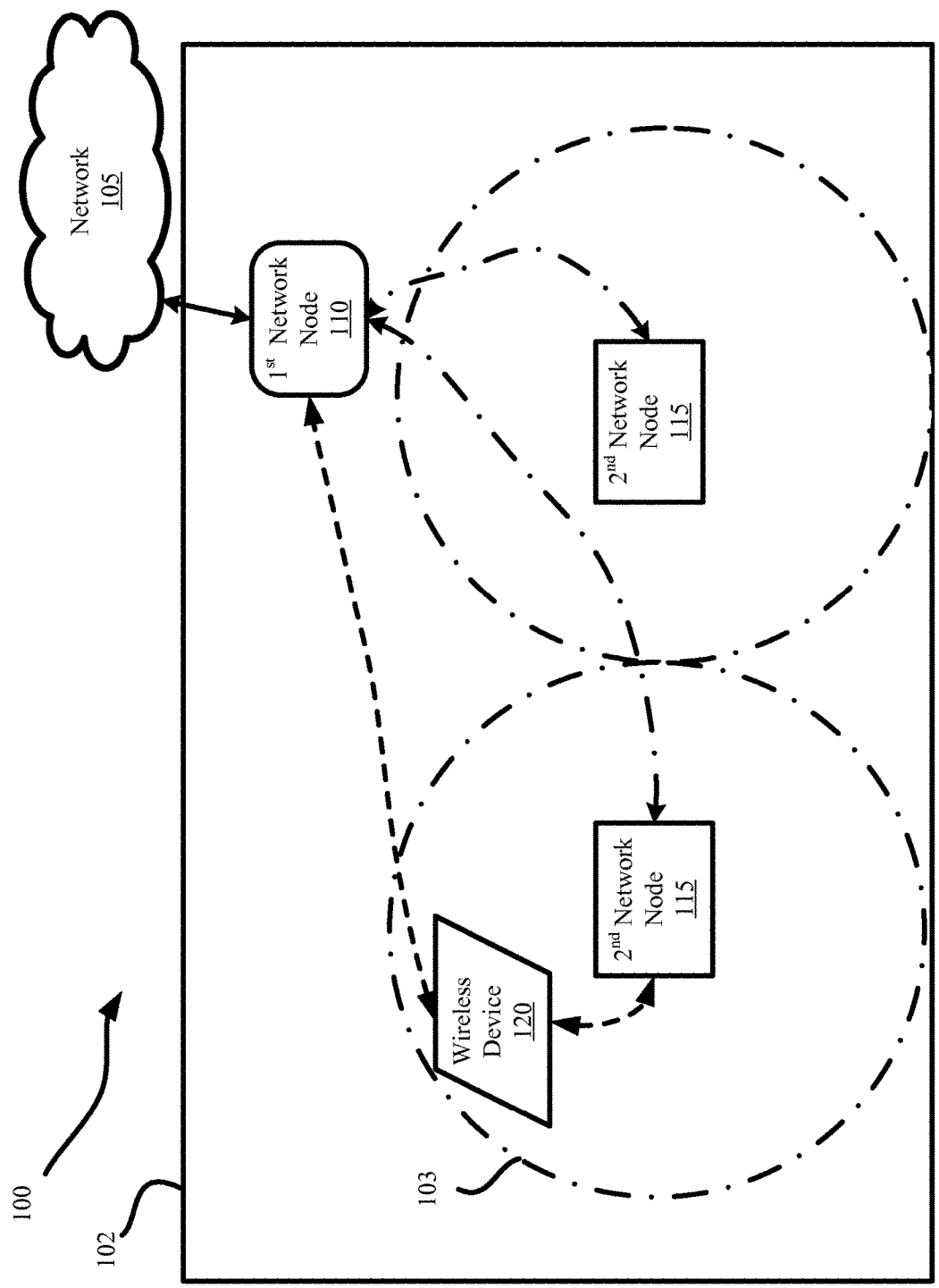
FIG. 1 illustrates a high level view of a wireless network system with proximity based dual authentication for a wireless device, according to an embodiment.

Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of the embodiments as claimed. The same numbers may be used in the Figures and the Detailed Description to refer to the same devices, parts, components, steps, operations, and the like.

Embodiments herein provide for a proximity based dual authentication system for wireless access to a network by a wireless device. A first network node may have a first wireless signal with a first signal range. A second network node may have a second wireless signal with a second signal range. The second signal range of the second network node may be less than the first signal range of the first network node. The second network node may validate the proximity of the wireless device to the second network node by confirming the wireless device is within the second signal range. The first network node may verify that the wireless device has a credential or authorization to access the network and verify that the wireless device is within the second signal range of the second network node.

An example where the benefits of the described embodiments may be utilized are within Wireless Local Area Network (WLAN) networks. WLAN networks may have WLAN routers that allow a wireless device to gain access to a network. The first network nodes may be referred to as WLAN routers herein. The WLAN routers may have signal ranges that can extend outside of an area for which the signal is intended to cover. This may become a problem for hotels or airports, for example. Hotels may have a WLAN router that has a signal that extends outside the walls of the building into a parking lot or off the premises, for example. This may provide security problems where unwanted wireless devices may access the WLAN network. This is especially true when the WLAN network is public. Limiting the range of WLAN routers is difficult and may diminish the strength of the signal when trying to provide maximum coverage and capabilities to all desired areas.

Other devices such as Wireless Personal Area Network (WPAN) device, e.g., a Bluetooth device, may be better at controlling the range of their wireless signals than a WLAN router. The second network node may be referred to as a WPAN device herein. A less range of a wireless signal from the one or more Bluetooth devices may be used to confirm proximity of a wireless device to the WLAN router. If a wireless device is within the range of the Bluetooth device, the WLAN router may allow the wireless device access to the network. The combination of authenticating a wireless device over a WLAN wireless signal and a WPAN wireless signal may reduce security issues to the network.

FIG. 1 illustrates a high level view of a wireless network system 100 with proximity based dual authentication for a wireless device 120, according to an embodiment. The network system 100 may include a network 105, a first network node 110, one or more second network nodes 115, and a wireless device 120. The network 105 may be various types of networks such as a wide area network (WAN), a virtual private network (VPN), or a local area networks (LAN), for example. The first network node 110 may communicate with the network 105 with a wired-line connection or a wireless connection. The first network node 110 may include a first wireless signal interface that uses a first wireless signal with a first range 102. The first network node 110 may also optionally include a second wireless signal interface that uses a second wireless signal having a second range 103 that is less than the first range of the first wireless signal. The first network node 110 is described in more detail when discussing FIG. 3 below.

In an embodiment, the second network node 115 may have at least the second wireless signal interface and optionally a first wireless signal interface. The second network node is described further in the discussion of FIG. 4 below. The wireless device 120 may also have both the first wireless signal interface and the second wireless signal interface. The wireless device 120 is further described in the discussion of FIG. 2 below. The first network node 110, the second network node 115, and the wireless device may communicate through one or both of the signal interfaces and may also employ encryption/decryption algorithms and authentications for ultimately accessing the network with the wireless device 120.

In an embodiment of the wireless network system 100, the wireless device 120 may provide a first credential or an authentication to the first network node 110 between the first wireless signal interfaces of each device. The first network node 110 may authorize the credential but then request a validation key or authentication that the wireless device 120 is within the second range of the second network node 115. This authentication or validation key may be referred to as a proximity validation herein. The wireless device 120 may communicate with the second network node 115 between the second wireless signal interfaces of each device. The lesser range of the second wireless signal from the wireless device 120 may increase the likelihood that the wireless device 120 is accessing the network 105 within a desired area. The second network node 115 may provide a validation key or proximity validation to the wireless device 120 if the wireless device 120 is within the second range. The validation key may be shared between the first network node 110 and the second network node 115 so the second network node 115 knows the correct validation key to give to the wireless device.

In an embodiment, the second network node 115 may also require a second credential from the wireless device 120 to ensure the wireless device is an authorized wireless device 120 to use the network 105 or the specific first or second network nodes 110 and 115. In another embodiment, the second network node 115 may communicate to the first network node 110 that the wireless device 120 is within the second range of the second wireless signal. This communication may be through the first or second wireless signal interfaces or both. Based on the proximity validation, the first network node 110 may allow the wireless device 120 access to the network 105 when both the first network node 110 authorizes the wireless device 120 and the wireless device 120 is within range of a second wireless signal of one of the network nodes 110,115. This may provide for proximity based dual authentication wireless network system.

Figure 2:
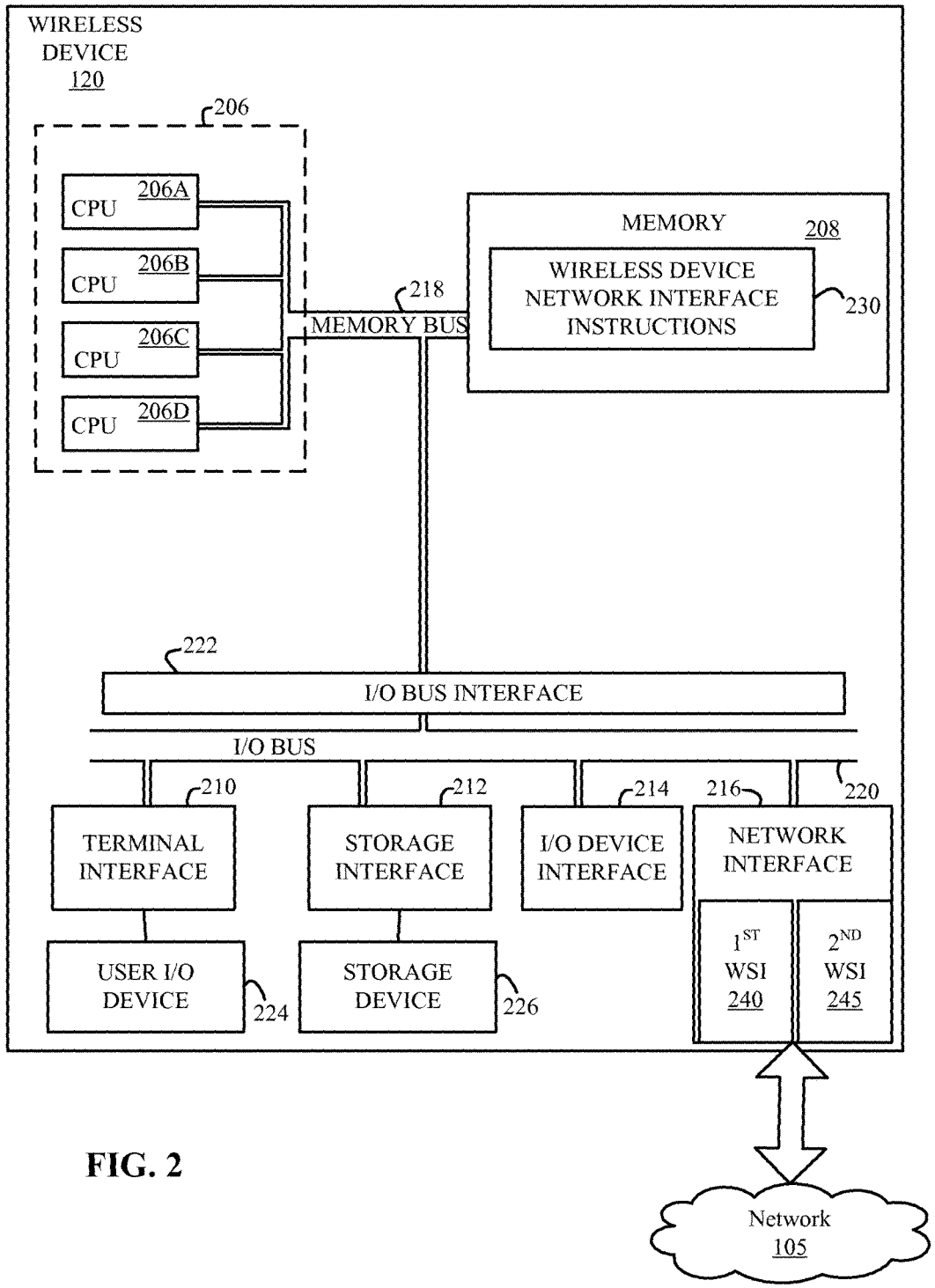
FIG. 2 depicts a high-level block diagram representation of the wireless device, according to an embodiment.

Referring to the drawings, FIG. 2 depicts a high-level block diagram representation of a wireless device 120, according to an embodiment. The major components of the wireless device 120 may include one or more processors 206, a main memory 208, a terminal interface 210, a storage interface 212, an I/O (Input/Output) device interface 214, and a network interface 216, all of which may be communicatively coupled, directly or indirectly, for inter-component communication via a memory bus 218, an I/O bus 220, and an I/O bus interface unit 222.

The wireless device 120 may contain one or more general-purpose programmable central processing units (CPUs) 206A, 206B, 206C, and 206D, herein generically referred to as the processor 206. In an embodiment, the wireless device 120 may contain multiple processors typical of a relatively large system; however, in another embodiment the wireless device 120 may alternatively be a single CPU system. Each processor 206 may execute instructions stored in the main memory 208 and may include one or more levels of on-board cache.

In an embodiment, the main memory 208 may include a random-access semiconductor memory, storage device, or storage medium (either volatile or non-volatile) for storing or encoding data and programs. In another embodiment, the main memory 208 may represent the entire virtual memory of the wireless device 120, and may also include the virtual memory of other devices coupled to wireless device 120 or connected via the network 105. The main memory 208 may be conceptually a single monolithic entity, but in other embodiments the main memory 208 may be a more complex arrangement, such as a hierarchy of caches and other memory devices.

The main memory 208 may store or encode wireless device network interface instructions 230. Although wireless device network interface instructions 230 are illustrated as being contained within the memory 208 in the wireless device 120, in other embodiments the wireless device network interface instructions 230 may be on different computer systems and may be accessed remotely, e.g., via the network 105. The wireless device 120 may use virtual addressing mechanisms that allow the programs of the wireless device 120 to behave as if they only have access to a large, single storage entity instead of access to multiple, smaller storage entities. Thus, while wireless device network interface instructions 230 are illustrated as being contained within the main memory 208, this element is not necessarily completely contained in the same storage device at the same time.

In an embodiment, wireless device network interface instructions 230 may include instructions or statements that execute on the processor 206 or instructions or statements that may be interpreted by instructions or statements that execute on the processor 206, to carry out the functions as further described below with reference to FIGS. 1, 5 and 6. In another embodiment, wireless device network interface instructions 230 may be implemented in hardware via semiconductor devices, chips, logical gates, circuits, circuit cards, other physical hardware devices, or a combination of these devices in lieu of, or in addition to, a processor-based system. In an embodiment wireless device network interface instructions 230 may include data in addition to instructions or statements.

The memory bus 218 may provide a data communication path for transferring data among the processor 206, the main memory 208, and the I/O bus interface 222. The I/O bus interface 222 may be further coupled to the I/O bus 220 for transferring data to and from the various I/O units. The I/O bus interface unit 222 communicates with multiple I/O interface units 210, 212, 214, and 216, which may also be known as I/O processors (IOPs) or I/O adapters (IOAs), through the I/O bus 220.

The I/O interface units support communication with a variety of storage and I/O devices. For example, the terminal interface unit 210 supports the attachment of one or more user I/O devices 224, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 224 and the computer system 200, and may receive output data via the user output devices. For example, a user interface may be presented via the user I/O device 224, such as displayed on a display device, played via a speaker, or printed via a printer.

The storage interface 212 supports the attachment of one or more disk drives or direct access storage devices 226 (which are typically rotating magnetic disk drive storage devices, although they could alternatively be other storage devices, including arrays of disk drives configured to appear as a single large storage device to a host computer). In another embodiment, the storage device 226 may be implemented via any type of secondary storage device. The contents of the main memory 208, or any portion thereof, may be stored to and retrieved from the storage device 226 as needed. The I/O device interface 214 may provide an interface to any of various other input/output devices or devices of other types, such as printers or fax machines. The network interface 216 may provide one or more communications paths from the wireless device 120 to other digital devices, network nodes, and networks 105. The network interface 216 may include a first wireless signal interface 250 and a second wireless signal interface 255. In an embodiment, the first wireless signal interface 250 may provide service for WLAN. The first wireless signal interface 250 may support one or more of various WLAN protocol standards. Such protocol standards may include the IEEE 802.11a, IEEE 802.11b, IEEE 802.11g, and/or IEEE 802.11n protocol standards. The first wireless signal interface 315 may produce a first wireless signal having a first range.

In an embodiment, the second wireless signal interface 255 may provide service for a WPAN. A type of WPAN the second wireless signal interface 255 may support is a Bluetooth communication standard, the IEE 802.15 standard, or another communication standard. In another embodiment, the wireless signal interface 255 may be optical and support an infrared data association (IrDA) or other light signals. The second wireless signal interface 255 may produce a second wireless signal having a second range. The second range may be less than the first range in order to authenticate proximity within the dual authentication system.

Figure 3:
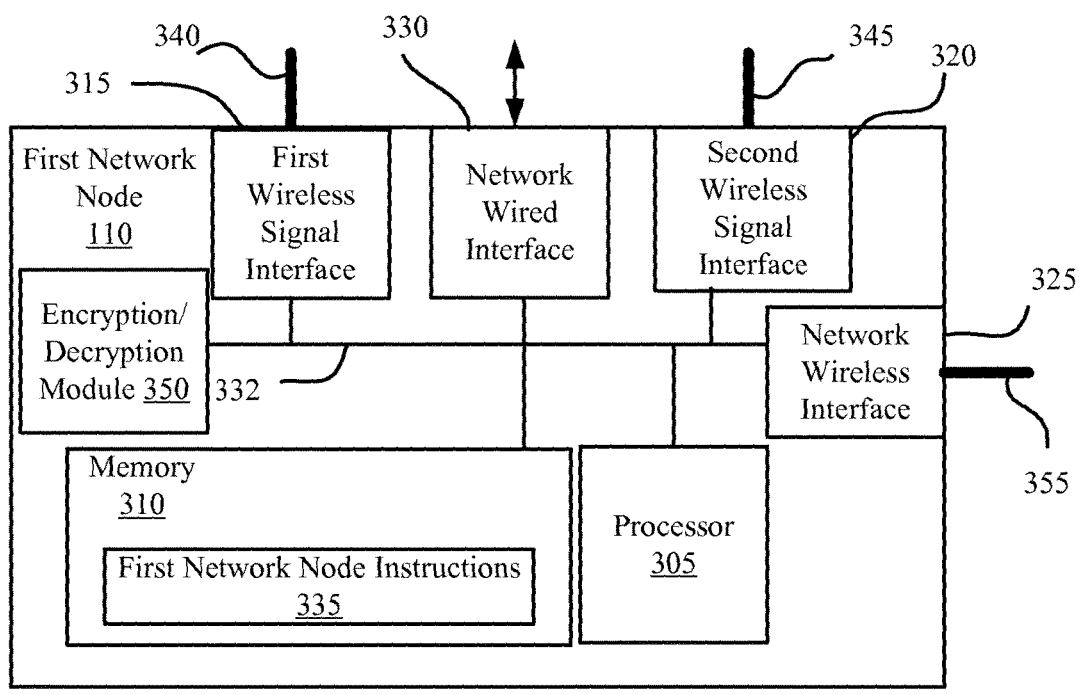
FIG. 3 depicts a high-level block diagram representation of a first network node, according to an embodiment.

FIG. 3 illustrates a block diagram of a first network node 110, according to an embodiment. The first network node 110 may include a processor 305 and memory 310. The memory 310 may include dynamic random access memory (DRAM), static random access memory (SRAM), erasable programmable read only memory (EPROM), and non-volatile storage. The processor may be a microprocessor, a digital signal processor, a collection of microprocessors and/or digital signal processors, and/or other type of processing unit that is known to be able to execute software instructions and interface with other components.

First network node instructions 335 may be stored in memory 310 and executed by the processor 305. Although first network node instructions 335 are illustrated as being contained within the memory 310 in the first network node 110, in other embodiments the first network node instructions 335 may be on different computer systems and may be accessed remotely, e.g., via the network 105. The first network node 110 may use virtual addressing mechanisms that allow the programs of the first network node 110 to behave as if they only have access to a large, single storage entity instead of access to multiple, smaller storage entities. Thus, while first network node instructions 335 are illustrated as being contained within the memory 310, this element is not necessarily completely contained in the same storage device at the same time.

In an embodiment, first network node instructions 335 may include instructions or statements that execute on the processor 305 or instructions or statements that may be interpreted by instructions or statements that execute on the processor 305, to carry out the functions as further described below with reference to FIGS. 1, 5 and 6. In another embodiment, first network node instructions 335 may be implemented in hardware via semiconductor devices, chips, logical gates, circuits, circuit cards, other physical hardware devices, or a combination of these devices in lieu of, or in addition to, a processor-based system. In an embodiment, first network node instructions 335 may include data in addition to instructions or statements.

According to an embodiment, the first network node 110 may include one or more encryption/decryption modules 350. Particularly, the first network node 110 may support WLAN and WPAN encryption operations for the wireless signal interfaces and network encryption operations for the network. The encryption/decryption modules 350 may use a variety of encryption schemes such as symmetric keys or public/private key encryption.

The first network node 110 may also include a first wireless signal interface 315, a second wireless signal interface 320, a network wired interface 330, and a network wireless interface 325. The first wireless signal interface 315 may be coupled to a first antenna 340. In an embodiment, the first wireless signal interface 315 may provide service for a WLAN. The first wireless signal interface 315 may support one or more of various WLAN protocol standards. Such protocol standards may include the IEEE 802.11a, IEEE 802.11b, IEEE 802.11g, and/or IEEE 802.11n protocol standards. The first wireless signal interface 315 may produce a first wireless signal having a first range.

The second wireless signal interface 320 may be coupled to a second antenna 345. In an embodiment, the second wireless signal interface 320 may provide service for a WPAN. A type of WPAN the second wireless signal interface 320 may support is a Bluetooth communication standard, the IEE 802.15 standard, or another communication standard. In another embodiment, the wireless signal interface 255 may be optical and support an infrared data association (IrDA) or other light signals. The second wireless signal interface 320 may produce a second wireless signal having a second range. The second range may be less than the first range as to validate proximity within the dual authentication system.

The network wired interface 330 may interface to a connection which couples the first network node 110 to a network, for example, a cable network, an optical network, or another type of broadband network. The connection may be wired. The first network node 110 may also or alternatively include a network wireless interface 325 that may be coupled to a third antenna 355. The network wireless interface 325 may provide a wireless connection to a wireless network.

According to an embodiment, the first wireless signal interface 315, network interface 330, second wireless signal interface 320, network wireless interface 325, encryption/decryption module 350, memory 310, and processor 305 may be all interconnected by one or more buses 332.

Figure 4:
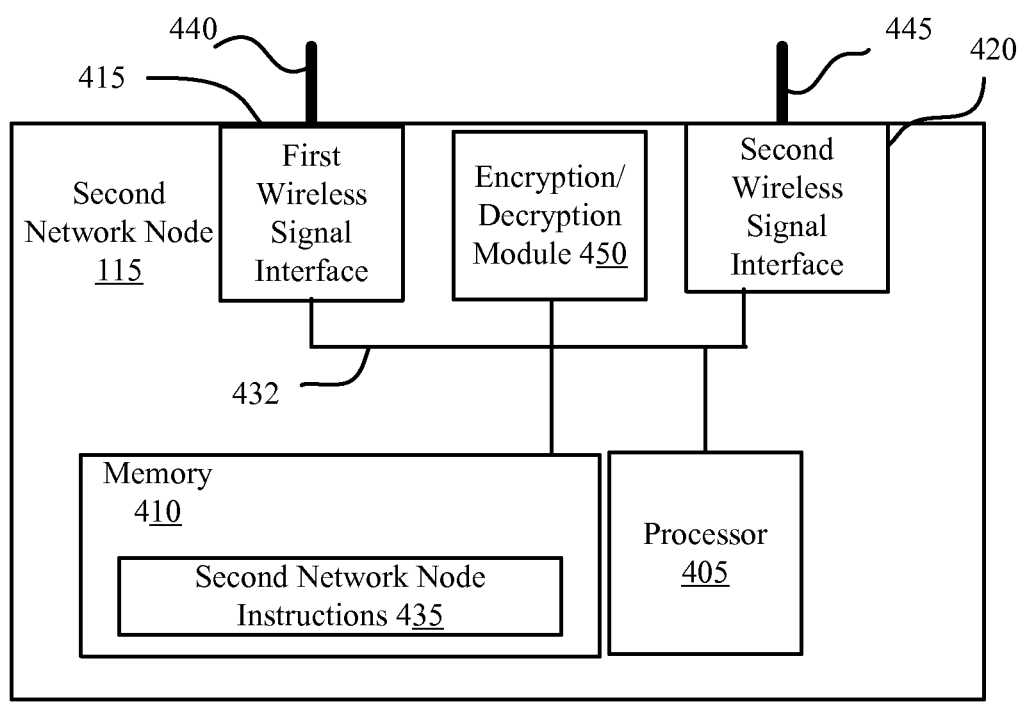
FIG. 4 depicts a high-level block diagram representation of a second network node, according to an embodiment.

FIG. 4 illustrates a block diagram of a second network node 115, according to an embodiment. The second network node 115 may include a processor 405 and memory 410. The memory 410 may include dynamic random access memory (DRAM), static random access memory (SRAM), erasable programmable read only memory (EPROM), and non-volatile storage. The processor may be a microprocessor, a digital signal processor, a collection of microprocessors and/or digital signal processors, and/or any type of processing unit that is known to be able to execute software instructions and interface with other components.

Second network node instructions 435 may be stored in memory 410 and executed by the processor 405. Although second network node instructions 435 are illustrated as being contained within the memory 410 in the second network node 115, in other embodiments the second network node instructions 435 may be on different computer systems and may be accessed remotely, e.g., via the network 105. The second network node 115 may use virtual addressing mechanisms that allow the programs of the second network node 115 to behave as if they only have access to a large, single storage entity instead of access to multiple, smaller storage entities. Thus, while second network node instructions 435 are illustrated as being contained within the memory 410, this element is not necessarily completely contained in the same storage device at the same time.

In an embodiment, second network node instructions 435 may include instructions or statements that execute on the processor 405 or instructions or statements that may be interpreted by instructions or statements that execute on the processor 405, to carry out the functions as further described below with reference to FIGS. 1, 5, and 6. In another embodiment, second network node instructions 435 may be implemented in hardware via semiconductor devices, chips, logical gates, circuits, circuit cards, other physical hardware devices, or a combination of these devices in lieu of, or in addition to, a processor-based system. In an embodiment, second network node instructions 435 may include data in addition to instructions or statements.

According to an embodiment, the second network node 115 may include one or more encryption/decryption modules 450. Particularly, the second network node 115 may support WLAN encryption operations and WPAN encryption operations for the wireless signal interfaces. The encryption/decryption modules 450 may use a variety of encryption schemes such as symmetric keys or public/private key encryption. The first wireless signal interface 415, second wireless signal interface 420, encryption/decryption module 450, memory 410, and processor 405 may be all interconnected by one or more buses 432.

The second network node 115 may also include a first wireless signal interface 415, a second wireless signal interface 420, a network wired interface 430, and a network wireless interface 425. The first wireless signal interface 415 may be coupled to a first antenna 440. In an embodiment, the first wireless signal interface 415 may provide service for a wireless local area network (WLAN). The first wireless signal interface 415 may support one or more of various WLAN protocol standards. Such protocol standards may include the IEEE 802.11a, IEEE 802.11b, IEEE 802.11g, and/or IEEE 802.11n protocol standards. The first wireless signal interface 415 may produce a first wireless signal having a first range.

The second wireless signal interface 420 may be coupled to a second antenna 445. In an embodiment, the second wireless signal interface 420 may provide service for a WPAN. A type of WPAN the second wireless signal interface 420 may support is a Bluetooth communication standard, the IEEE 802.15 standard, or another communication standard. In another embodiment, the wireless signal interface 255 may be optical and support an infrared data association (IrDA) or other light signals. The second wireless signal interface 420 may produce a second wireless signal having a second range. The second range may be less than the first range in order to validate proximity within the dual authentication system.

Figure 5:
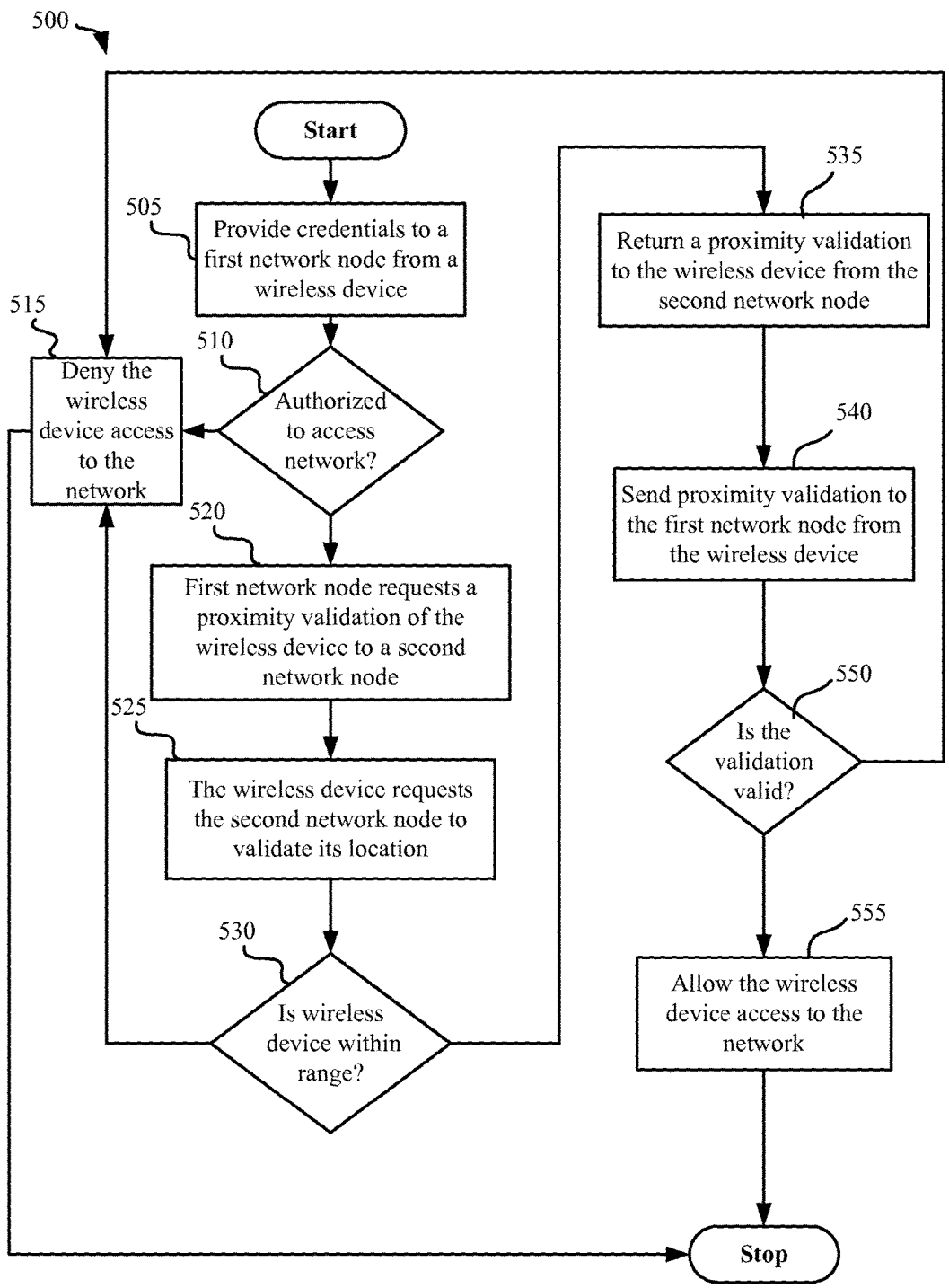
FIG. 5 illustrates a flow chart of a method of proximity based dual authentication for the wireless network system, according to an embodiment.

FIG. 5 illustrates, with reference to FIG. 1, a flow chart of a method 500 for wireless network system 100 with proximity based dual authentication, according to an embodiment. In operation 505, a user of a wireless device 120, may provide credentials to a first network node 110 between the first wireless signal interfaces that the wireless device 120 and the first network node 110 include. The communication and credentials occur so that the wireless device 120 may connect to the network 105. In other embodiments, in the case of a public first network node 110, the wireless device 120 may not need to give credentials but may just try to access the network 105 through the first network node 110.

In operation 510, the first network node 110 may determine whether the wireless device is authorized to access the network 105. If the wireless device is not authorized to access the network 105, then, in operation 515, the first network node may deny the wireless device 120 access to the network 105 and the method may end. If the wireless device 120 is authorized to access the network, then, in operation 520, the first network node 110 may request that the wireless device 120 validate its proximity. This is to determine whether the location of the wireless device 120 is within a desired range of the first wireless signal produced by the first wireless signal interface of the first network node 110.

In operation 525, the wireless device 120 may request the second network node 115 to validate the proximity of the wireless device 120. This proximity validation and communication between the wireless device 120 and the second network node 115 may be over the second wireless signal interfaces 245 and 445, which may use a second wireless signal that has a lesser wireless range than the first wireless signal. In operation 530, the second network node 115 may determine whether the wireless device 120 is within the second range of its second wireless signal. The second network node 115 may determine that the wireless device 120 is within the second range by just being able to communicate with the wireless device 120. In other embodiments, the second network node 115 may require a second credential or another authentication from the wireless device 120 before determining whether the wireless device 120 is within the second range. If the wireless device 120 is not within the second range of the second network node 115, then, in operation 515, the wireless device 120 may be denied access to the network 105. The second network node 115 may deny the access or the first network node 110 may deny the access when it does not receive a proximity validation after a time interval.

If the wireless device is within the second range, then, in operation 535, the second network node 115 may send to the wireless device 120 a proximity validation, e.g., validation key, that the user is within the second range. In operation 540, after the wireless device 120 receives the proximity validation in operation 535, then the wireless device may send the proximity validation to the first network node 110. In operation 550, the first network node 110 may determine whether the proximity validation is valid. If the proximity validation is not valid, then, in operation 515, the first network node 110 may deny the wireless device 120 access to the network 105 and the method 500 may end. If the proximity validation is valid, then, in operation 555, the first network node 110 may grant the wireless device 120 access to the network 105.

In an alternative embodiment, the second network node 115 may gather information from the wireless device 120 when the wireless device 120 is trying to validate its location within the second range. When the wireless device 120 is determined to be within the second range, the second network node 115 may validate and communicate to the first wireless access node 110 that the particular wireless device 120 is within the second range. The communication between the first and second network nodes may be between the first wireless signal interfaces, second wireless signal interfaces, or both of each network node.

Figure 6:
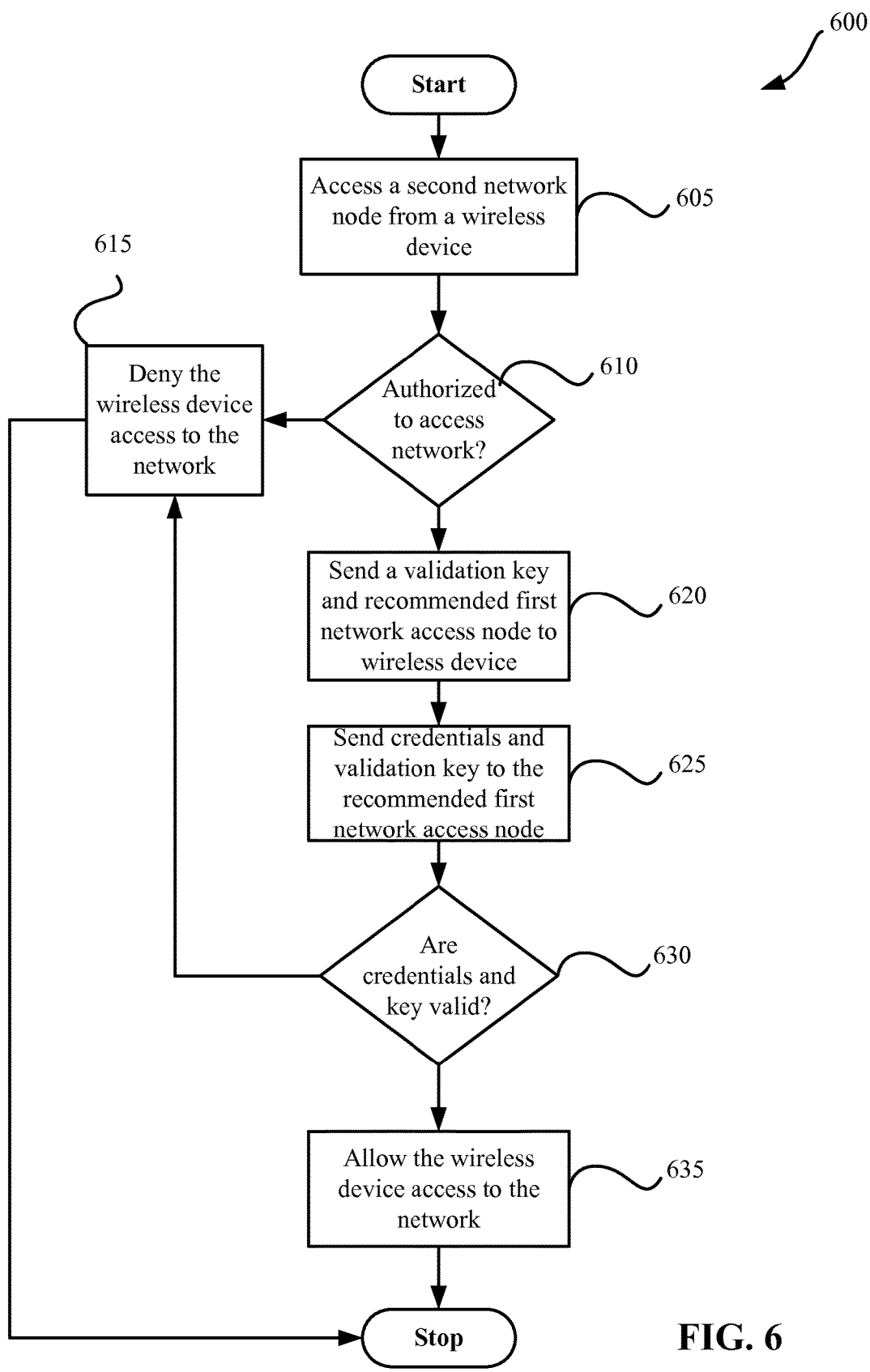
FIG. 6 illustrates a flow chart of an alternative method of proximity based dual authentication for the wireless network system, according to an embodiment.

FIG. 6, in reference to FIG. 1, illustrates a flow chart of a method 600 for accessing a network 105 with the proximity based dual authentication, according to an embodiment. In an embodiment, the first network node 110 may be configured to not broadcast its service set identifier such that it is obfuscated from the wireless device. Therefore, the wireless device 120 may look for a second network node 115 first to verify the wireless device 120 is within the second range of the second network node 115. In operation 605, the wireless device 120 may request a proximity validation from the second network node 115 that it is within the second range. The wireless device 120 may also request a first network node 110 to use to access the network 105. In operation 610, the second network node 115 may determine whether to validate the proximity of the wireless device 120. The second network node 115 may validate proximity when the wireless device 120 is within the second range. In addition, the second network node 115 may require a second credential from the wireless device 120 as an added layer of security to validate proximity of the wireless device 120. If the wireless device 120 is not authorized to access the network 105 meaning it is not within the second range or lacks a second credential, then, in operation 615, the wireless device 120 may be denied access to the network 105.

If the wireless device 120 is authorized to access the network 105, then, in operation 620, the second network node 115 may validate proximity the wireless device 120 by sending the wireless device 120 a proximity validation, e.g., validation key, and also a recommendation of which first network node 110 to use when accessing the network 105. The recommendation may be based off of a factor such as distance between the wireless device 120 and the first network node 110. In other embodiments the recommendation may be based off of signal strength, usage of the network node, or a combination of factors, for example. In operation 625, the wireless device 120 may request access to the network 105 through the first network node 110 that was recommended. The wireless device 120 may provide a first credential (if needed) as well as the proximity validation. In an embodiment, the second network node 115 may directly validate the wireless device 120 with the first network node 110 instead of first sending the proximity validation to the wireless device 120.

In operation 630, the first network node 110 may authorize the wireless device 120. If the first credentials or proximity validation are not authorized, then, in operation 615, the wireless device 120 may be denied access to the network 105 and the method 600 may end. If the first credentials and the proximity validation are authorized, then, in operation 635, the first network node 110 may allow the wireless device 120 access to the network 105.

In an embodiment, once the wireless device 120 is connected to the network 105, the first network node 110 may require the wireless device 120 to validate the location of the wireless device 120 over a time interval. This embodiment may be used to monitor the location the wireless device 120 and to log out the wireless device 120 when it exits the second range. The wireless device 120 may obtain new proximity validation from the second network node 115 after a time interval and return them to the first network node 110. If the first network node 110 does not receive an updated proximity validation after the time interval, then the first network node 110 may log out the wireless device 120 from the network 105.

Referencing FIGS. 1, 3 and 4, in other embodiments, the first network node 110 may be combined with the second network node 115. The combined nodes may perform the functions of each described herein. When the wireless device 120 is in range of the second wireless signal interface 345 of the first network node 110, then the first network node may determine that the wireless device 120 is within the second range to satisfy the proximity validation aspect of the dual authentication. The first network node 110 may perform any of the functions performed by the second network node 115 described above.

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the invention has been described with reference to specific embodiments thereof, those skilled in the art will be able to make various modifications to the described embodiments without departing from the true spirit and scope of the embodiments. The terms and descriptions used herein are set forth by way of illustration only and are not meant as limitations. Those skilled in the art will recognize that these and other variations are possible within the spirit and scope of the embodiments as defined in the following claims and their equivalents.

What is claimed is:

1. A system for accessing a network wirelessly, comprising:
   a wireless device;
   a first wireless network node comprising a wireless local area network that is allowed to access the network, the first wireless network node generating a first wireless signal having a first signal range extending outside of an area for which the first wireless signal is intended to cover resulting in security problems with unwanted wireless devices accessing the first wireless network;
   a second wireless network node comprising a wireless personal area network generating a second wireless signal having a second signal range, the second signal range is less than the first signal range;
   a first wireless interface configured to receive an authentication to access the first wireless network node from the wireless device via the first wireless signal having the first signal range;
   a first authentication of the wireless device using a processor of the first wireless local area network that determines whether the wireless device is authorized to access the network and, in response to determining that the wireless device is authorized to access the network, a proximity of the wireless device is obtained to determine whether the wireless device is in a location that is in a desired range of the first wireless signal of the first wireless network node; and
   a second authentication of the wireless device using the second wireless personal area network validates a location of the wireless device by determining whether the wireless device is within the second signal range of the second wireless signal, the second authentication using the second signal range to confirm said determined proximity of the wireless device to the first wireless signal of the wireless local area network;
   wherein when the wireless device is within the second signal range of the second wireless signal of the second wireless personal area network, a proximity validation key is generated and transmitted from the second wireless personal area to the wireless device identifying that the wireless device resides within the second signal range, the proximity validation key being transmitted from the wireless device to the wireless local area network to determine whether the proximity validation is valid for accessing the network through the wireless local area network; and
   upon a determination that the proximity validation key is valid, the wireless local area network allows the wireless device to access the network upon receipt of indication that the proximity validation key is valid; and
   whereby combination of the first authentication over the first wireless local area network and the second authentication over the second wireless personal area network reduces security issues for the wireless local area network, and avoids the need to limit range and strength of the first signal range of said wireless local area network.

2. The system of claim 1, wherein the second network node is further configured to send to the wireless device an address of a recommended first network node for accessing the network through the proximity validation when the wireless device is within the second range of the second wireless signal.

3. The system of claim 2, wherein the first network node address provided by the second network node is determined based on one or more of distance between the wireless device and the first node, signal strength of the first network node, and usage of the first network node.

4. The system of claim 1, wherein the first network node is obfuscated from the wireless device until the proximity of the wireless device is validated by the second network node.

5. The system of claim 1, wherein the second network node is configured within the first network node.

6. The system of claim 1, wherein the first wireless signal is a wireless local area network signal.

7. The system of claim 1, wherein the second wireless signal is a wireless personal area network signal.

8. A computer program product for accessing a network wirelessly, the computer program product comprising a non-transitory computer readable storage medium having program code embodied therewith, the program code executable by a first network node to cause the first network node to:
   receive from a wireless device an authentication to access a wireless local area network from the wireless device via a first wireless signal having a first signal range that extends outside of an area for which the first wireless signal is intended to cover resulting in security problems with unwanted wireless devices accessing the wireless local area network;
   receive from a wireless personal area network a second wireless signal having a second signal range that is less than the first signal range;
   determine in a first authentication whether the wireless device is authorized to access the network in response to the authentication to access the network received from the wireless device via the first wireless signal having the first signal range;
   receive confirmation that the wireless device is authorized to access the network;
   determine a proximity of the wireless device to determine whether the wireless device is in a location that is in a desired range of the first wireless signal of the first signal range of the wireless local area network;
   validate in a second authentication a location of the wireless personal area network to
   determine whether the wireless device is within the second signal range of the second wireless signal, the second authentication using the second signal range to confirm said determined proximity of the wireless device to the first wireless signal of the wireless local area network;
   receive confirmation that the wireless device is within the second signal range of the second wireless signal of the wireless personal area network;
   request a proximity validation key from the wireless personal area network to the wireless device identifying that the wireless device resides within the second signal range, the proximity validation key being transmitted from the wireless device to the wireless local area network to determine whether the proximity validation is valid for accessing the network through the wireless local area network;
   receive the proximity validation key indicating that the wireless device is within the second signal range of the second wireless signal, wherein the second signal range is less than the first range; and
   enable the wireless device to access the network upon an indication that the proximity validation is valid,
   whereby combination of the first authentication over the first wireless local area network and the second authentication over the second wireless personal area network reduces security issues to the network while avoiding the need to limit range of and diminish strength of the first signal range.

9. The computer program product of claim 8, wherein the program code is further configured to cause the first network node to obfuscate the first network node from the wireless device until the proximity of the device is validated by the second network node.

10. The computer program product of claim 8, wherein the first network node includes memory and a processor, with a first set of instructions stored in the memory and executed by the processor.

11. The computer program product of claim 8, wherein the first network node includes one or more encryption/decryption modules for wireless signal interfaces and network encryption operations.

12. The computer program product of claim 8, wherein the first network node includes a network wireless interface that provides a wireless connection to a wireless network, and the second wireless signal couples the first network node to said wireless network.

13. The computer program product of claim 8, wherein credentials or another authentication from the wireless device are used to determine whether the wireless device is within the location of the second network node.

14. The computer program product of claim 8, wherein the proximity validation is a validation key indicating that the user and the wireless device are within the second range.

15. The computer program product of claim 8, wherein credentials or another authentication from the wireless device are used to determine whether the wireless device is within the location of the second network node.

16. The computer program product of claim 8, wherein when the wireless device is determined to be within the second range, the first and second network nodes communicating to each other via the first wireless signal.

17. The computer program product of claim 8, wherein when the wireless device is determined to be within the second range, the first and second network nodes communicating to each other via the second wireless signal.

18. The computer program product of claim 8, wherein when the wireless device is determined to be within the second range, the first and second network nodes communicating to each other via both the first and second wireless signals.

19. A system for accessing a network wirelessly, comprising:
   a wireless device;
   a wireless local area network that is allowed to access the network, the wireless local area network generating a first wireless signal having a first signal range extending outside of an area for which the first wireless signal is intended to cover resulting in security problems with unwanted wireless devices accessing the first wireless network;
   a wireless personal area network generating a second wireless signal having a second signal range, the second signal range is less than the first signal range;
   a first authentication of the system identifying that the wireless device is authorized to access the network and, in response thereto, obtaining a proximity of the wireless device to determine whether the wireless device is in a location that is in a desired range of the first wireless signal of the wireless local area network; and
   a second authentication of the system using the second wireless personal area network to validate a location of the wireless device by determining whether the wireless device is within the second signal range of the second wireless signal, the second authentication using the second signal range to confirm said determined proximity of the wireless device to the first wireless signal of the wireless local area network;
   when the wireless device is within the second signal range of the second wireless signal of the second wireless personal area network, a proximity validation key is generated and transmitted from the second wireless personal area network to the wireless device identifying that the wireless device resides within the second signal range;
   the proximity validation key and credentials being transmitted from the wireless device to the wireless local area network to determine based on the credentials whether the proximity validation is valid for accessing the network through the wireless local area network; and
   upon a determination that the proximity validation key is valid, the wireless local area network allows the wireless device to access the network upon receipt of indication that the proximity validation key is valid; and
   whereby combination of the first authentication over the first wireless local area network and the second authentication over the second wireless personal area network reduces security issues to the network while avoiding the need to limit range of and diminish strength of the first signal range.

20. The system of claim 19, wherein the wireless personal area network determines whether to validate the proximity of the wireless device by requesting a second credential from the wireless device as an added layer of security to validate proximity of the wireless device.

* * * * *